(12) United States Patent
Bortz et al.

(10) Patent No.: US 9,059,853 B1
(45) Date of Patent: Jun. 16, 2015

(54) SYSTEM AND METHOD FOR PREVENTING A COMPUTING DEVICE FROM OBTAINING UNAUTHORIZED ACCESS TO A SECURE NETWORK OR TRUSTED COMPUTING ENVIRONMENT

(75) Inventors: Mark A. Bortz, Robins, IA (US); James N. Potts, Cedar Rapids, IA (US); Gregory W. Rice, Cedar Rapids, IA (US); Karl F. Hoech, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 667 days.

(21) Appl. No.: 13/402,278

(22) Filed: Feb. 22, 2012

(51) Int. Cl.
*H04L 29/06* (2006.01)
*H04L 9/32* (2006.01)
*H04L 29/12* (2006.01)
*G06F 21/00* (2013.01)

(52) U.S. Cl.
CPC *H04L 9/32* (2013.01); *H04L 29/06* (2013.01); *H04L 61/203* (2013.01); *G06F 21/00* (2013.01)

(58) Field of Classification Search
CPC ......... H04L 9/32; H04L 29/06; H04L 61/203; H04L 63/08; H04L 63/0407; H04L 63/0435; H04W 12/00; G06F 21/00
USPC .............................. 713/156, 168; 726/4, 9, 13
See application file for complete search history.

(56) References Cited

U.S. PATENT DOCUMENTS

| | | | |
|---|---|---|---|
| 6,772,347 B1 | 8/2004 | Xie | |
| 7,640,433 B1 | 12/2009 | Marek | |
| 8,631,244 B1 * | 1/2014 | Potts et al. | 713/188 |
| 8,661,246 B1 * | 2/2014 | Hoech et al. | 713/156 |
| 2004/0103322 A1 | 5/2004 | Wesinger | |
| 2004/0111519 A1 | 6/2004 | Fu | |
| 2004/0255126 A1 * | 12/2004 | Reith | 713/183 |
| 2005/0262558 A1 | 11/2005 | Usov | |
| 2006/0048212 A1 * | 3/2006 | Tsuruoka et al. | 726/4 |
| 2007/0022479 A1 | 1/2007 | Sikdar | |
| 2007/0266063 A1 | 11/2007 | Camiel | |
| 2008/0276309 A1 * | 11/2008 | Edelman | 726/9 |

(Continued)

OTHER PUBLICATIONS

MIT Kerberos Consortium; Why Is Kerberos a Credible Security Solution?; 2008 by MIT Kerberos Consortium; Downloaded From www.kerberos.org/softwarewhykerberos.pdf on Sep. 16, 2011.

*Primary Examiner* — Thuong Nguyen
(74) *Attorney, Agent, or Firm* — Angel N. Gerdzhikov; Donna P. Suchy; Daniel M. Barbieri

(57) ABSTRACT

A system for preventing a computing device from obtaining unauthorized access to a secure network includes a client agent operably connected to the computing device configured to intercept network traffic information from applications running on the computing device and transmit a network request including application information and the network traffic information. A network token broker operably connected to the network client agent contains a database of application information. The network token broker is configured to cooperate with the network client agent for i) verifying whether the network request should be granted access to the secure network, and ii) cryptographically signing the intercepted network traffic information with a network authorization token, to authorize network access for the intercepted network traffic information. A guard system is configured to inspect the network traffic information from the computing device and reject any traffic information not signed with the network authorization token.

28 Claims, 4 Drawing Sheets

(56) References Cited

U.S. PATENT DOCUMENTS

| | | | |
|---|---|---|---|
| 2008/0320584 A1* | 12/2008 | Hamilton et al. | 726/13 |
| 2009/0094342 A1 | 4/2009 | Leiba | |
| 2009/0158430 A1 | 6/2009 | Borders | |
| 2009/0313682 A1* | 12/2009 | Rajput et al. | 726/4 |
| 2010/0077445 A1 | 3/2010 | Schneider | |
| 2010/0122313 A1 | 5/2010 | Ivgi | |
| 2010/0217971 A1* | 8/2010 | Radhakrishnan et al. | 713/153 |
| 2010/0312843 A1 | 12/2010 | Robinson | |
| 2011/0231652 A1* | 9/2011 | Bollay et al. | 713/153 |
| 2011/0307947 A1* | 12/2011 | Kariv et al. | 726/9 |
| 2013/0046976 A1* | 2/2013 | Rosati et al. | 713/168 |
| 2013/0055242 A1* | 2/2013 | Tsirkin et al. | 718/1 |

* cited by examiner

SYSTEM AND METHOD FOR PREVENTING A COMPUTING DEVICE FROM OBTAINING UNAUTHORIZED ACCESS TO A SECURE NETWORK OR TRUSTED COMPUTING ENVIRONMENT

BACKGROUND OF THE INVENTION

1. Field of the Invention

The present invention relates generally to communication networks and more particularly to an enhanced system for protecting communication networks from an unauthorized computer user.

2. Description of the Related Art

Sophisticated attacks against computer systems are increasing dramatically. These attacks become even more problematic with the increased functionality of various communication devices, including cell phones. For example, when trying to provide trusted functionality to cell phones utilizing sleeves, there is a growing need to determine 1) if the software on the phone is supposed to communicate with the sleeve, 2) if the software has been corrupted, and 3) if the appropriate phone is paired with the sleeve. It is extremely difficult to guard a system against these attacks. Many attacks now utilize zero-day (unknown before hand) attack factors that are not recognized by virus scanners. Attacks often combine highly sophisticated social-engineering and custom exploits to induce victims to load malicious software. These custom exploits are not recognized by available anti-virus/anti-spyware systems. Subverted machines use standard mechanisms to leak information. Exploits use standard protocols (e.g. HTTP) to transmit information, with network traffic indistinguishable from legitimate traffic or concealed within an encrypted transport (e.g. HTTPS).

U.S. Publicn. No. 2005/0262558, entitled "ON-LINE CENTRALIZED AND LOCAL AUTHORIZATION OF EXECUTABLE FILES," discloses a system and method for controlling the execution of executable files. The executables are identified by either a cryptographic digest or a digital certificate. The cryptographic digest is computed from the binary image of the executable. An executable that is attempting to execute is intercepted by a protection module that consults a database of stored rules over a secure channel to determine whether or not the executable can be identified as a permitted executable and whether or not it has permission to execute on a particular computer system under certain specified conditions. If a stored permission is available, it is used to control the execution. Otherwise, the user is consulted for permission.

U.S. Publicn. No. 2010/0077445, entitled "GRADUATED ENFORCEMENT OF RESTRICTIONS ACCORDING TO AN APPLICATION'S REPUTATION," discloses security software on a client that observes a request for a resource from an application on the client and then determines the application's reputation. The application's reputation may be measured by a reputation score obtained from a remote reputation server. The security software determines an access policy from a graduated set of possible access policies for the application based on the application's reputation. The security software applies the access policy to the application's request for the resource. In this way, the reputation-based system uses a graduated trust scale and a policy enforcement mechanism that restricts or grants application functionality for resource interactivity along a graduated scale.

The Kerberos consortium provides technology that allows for strong authentication in open, distributed networks, providing a single mechanism for authentication of users and services. While Kerberos provides authentication services in the context of an untrusted network environment, it does not provide authentication of untrusted processes and devices to a trusted network or service. Nor is it designed to work in context of a high-assurance guard separating untrusted from trusted environments. (MIT Kerberos Consortium; "Why is Kerberos a Credible Security Solution?"; 2008 by MIT Kerberos Consortium; www.kerberos.org/software/whykerberos.pdf; accessed 13 Feb. 2012.)

SUMMARY OF THE INVENTION

In a broad aspect, the present invention is a system for preventing a computing device from obtaining unauthorized access to a secure network. A network client agent is operably connected to the computing device and is configured to intercept network traffic information from applications running on the computing device and transmit a network request comprising application information and the network traffic information. A network token broker is operably connected to the network client agent and contains a database of application information. The network token broker is configured to cooperate with the network client agent for i) verifying whether the network request should be granted access to the secure network, and ii) cryptographically signing the intercepted network traffic information with a network authorization token, to authorize network access for the intercepted network traffic information. A guard system is operably connected to the computing device and the network client agent. It is configured to inspect the network traffic information from the computing device and reject any traffic information not signed with the network authorization token.

The computing device may be, for example, a smart cell phone, laptop computer, computer pad, or other device that facilitates access to a remote network. The network token broker and the guard system may be embodied within a communication sleeve constructed to attach to the computing device. Use of a sleeve and applying the hardened proxy (internet protocol) IP provides the ability to provide access for a generally "untrusted" computing device (e.g. smart phone) to a secure network. The hardened proxy IP enables determination if the software has been corrupted, whether only approved software is attempting to communicate with the secure network, and that the appropriate phone is installed (paired) with the sleeve.

US 2005/0262558, discussed above, involves use of file hashes to decide whether to allow an executable program to launch. It is a host-based system. The present invention, on the other hand, does not prevent launching of an executable program. The present invention controls access to a network or trusted computing environment.

The present invention prevents applications from connecting to the outside world by adding device-level and process-level authentication and authorization to network traffic.

In addition to preventing a computing device from obtaining unauthorized access to a secure network the inventive concepts herein can be extended to authenticating a request from an untrusted computing device to access an interface for service functions in a trusted computing environment. In such a system a service client agent operably connected to an untrusted computing device is configured to present identity-recognition credentials and unique hardware identifiers with service requests from service applications to access an interface to service functions in a trusted computing environment. A service token broker is contained in the trusted computing environment and is operably connected to the service client agent. It contains a database of identifying credentials and unique hardware identifiers. It is configured to cooperate with the service client agent for i) verifying whether the service requests should have access to the trusted computing environment, and ii) cryptographically signing the service requests with a service authorization token, to authorize access for the service functions. A service interface in a trusted computing environment is operably connected to the service client agent and is configured to inspect the service requests from the untrusted computing device and reject any service requests not signed with the service authorization token.

DETAILED DESCRIPTION OF THE INVENTION

Figure 1:
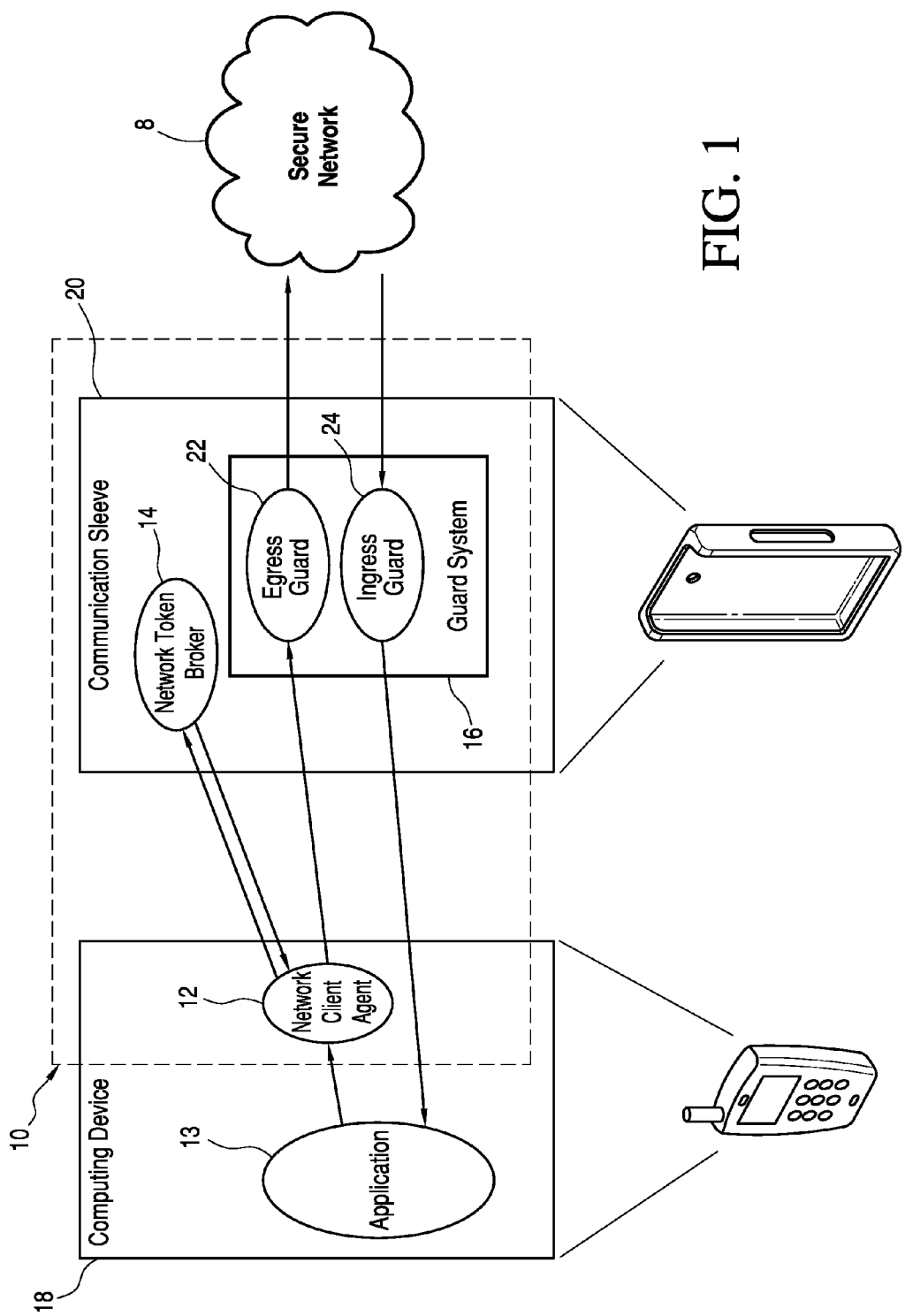
FIG. 1 is a schematic illustration of a first embodiment of the present invention embodied as a system for preventing a computing device from obtaining unauthorized access to a secure network.

Referring now to the drawings and the characters of reference marked thereon, FIG. 1 illustrates a first embodiment of the system for preventing a computing device from obtaining unauthorized access to a secure network 8 of the present invention, designated generally as 10. The system 10 includes a network client agent 12; a network token broker 14; and, a guard system 16. The network client agent 12 is operably connected to a computing device 18 and is configured to intercept network traffic information from the applications 13 running on the computing device 18 and transmit a network request comprising application information of the network traffic information. The network token broker 14 is operably connected to network client agent 12 and contains a database of application information. The network token broker 14 is configured to cooperate with the network client agent 12 for i) verifying whether the network request should be granted access to the secure network 8, and ii) cryptographically signing the intercepted network traffic information with a network authorization token, to authorize network access for the intercepted network traffic information. The guard system 16 is operably connected to the computing device 18. The guard system is also operably connected to either the network client agent 12 or the network token broker 14 and is configured to inspect the network traffic information from the computing device 18 and reject any traffic information not signed with the network authorization token.

The computing device 18 may be, for example, a type of smart cell phone, laptop computer, computer pad, etc. The network client agent 12 may be a software component generally running on the computing device 18 or alternately may be a firmware function implemented in computing device 18 hardware. The network token broker 14 and the guard system 16 may be embodied within a communication sleeve 20 constructed to attach to the computing device 18. The communication sleeve 20 may include, for example, any number of casings for example protective enclosures, charging or docking cradles, surplus batteries, antenna extenders, mounting brackets or peripheral components for protecting and holding the computing device 18 or extending its functionality. The network token broker 14 can be implemented as a software component running on the communication sleeve 20 or as a firmware component in communication sleeve 20 hardware. The guard system 16 can be implemented as a high-assurance network guard system providing strict isolation between the secure network 8 and the computing device 18. Or, the guard system 16 can be implemented as a software component providing functionality similar to a commercially available firewall proxy system, a standalone software component running on a computer server, or a standalone specialized computer system. The guard system 16 preferably includes an egress guard 22 and an ingress guard 24. The network client agent 12 may be incorporated into the computing device 18 or may be embodied as a specialized item of computer hardware. Thus, the phrase that the network client agent 12 is "operably connected" to the computing device 18 is deemed to be broadly construed to encompass both potential scenarios.

The network client agent 12 network token broker 14 may provide the cryptographic signing by signing individual network packets. This may be provided by, for example, applying internet protocol (IP) encapsulation by adding a cryptographic hash field to the intercepted network traffic information. Alternatively, it may be accomplished by applying an Internet Protocol header field such as an IPv4 header option field or IPv6 header chain field to the intercepted network traffic information. Or, such a signing may be accomplished by applying a transport layer wrapping protocol to the intercepted network traffic information.

The network token broker 14 may provide the cryptographic signing by adding a token. This may be by adding a tag-value pair to an application layer protocol.

Figure 2:
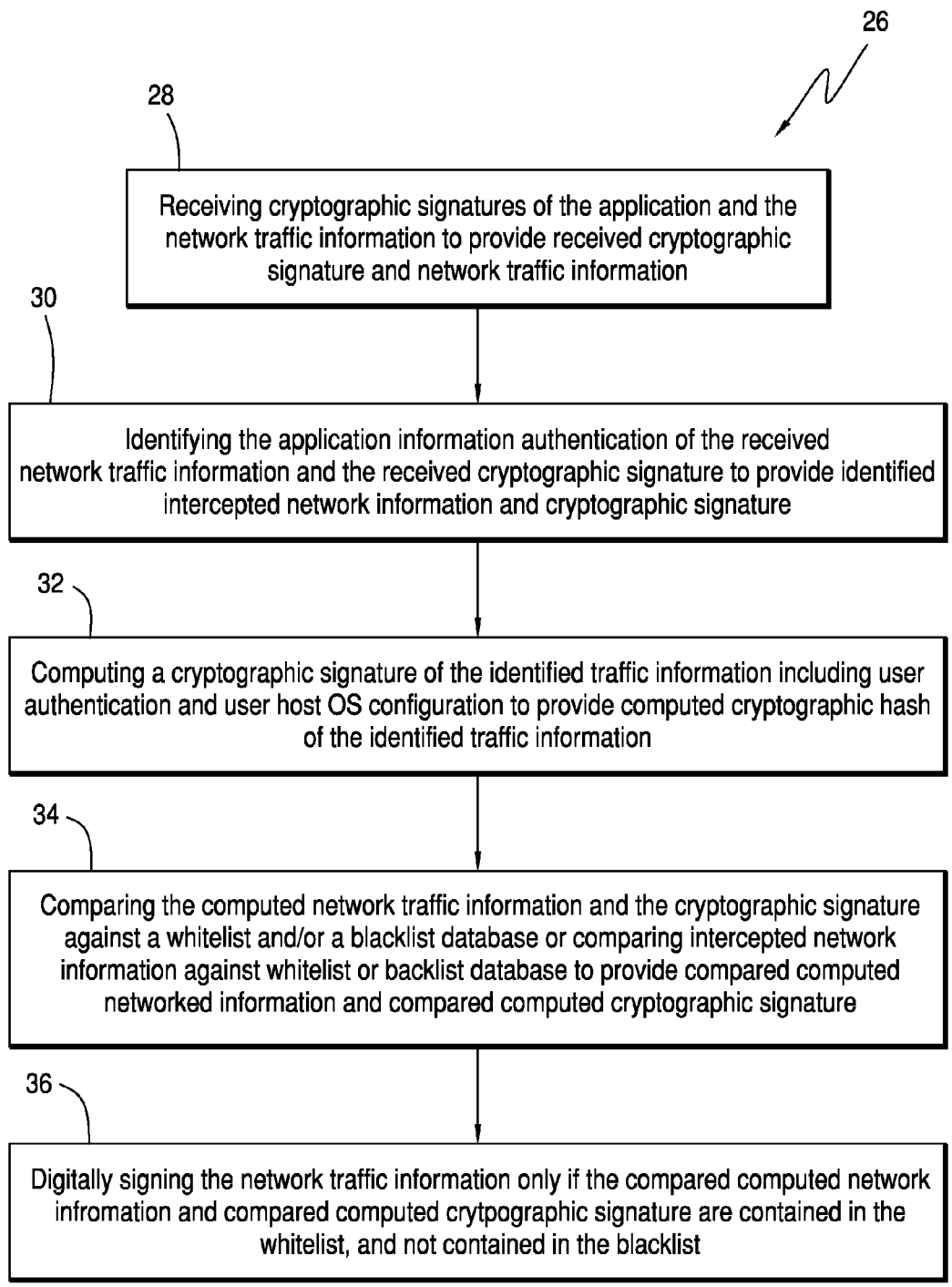
FIG. 2 is a flow chart showing one example of a decision making technique utilized by the network token broker of the present invention.

Alternatively, the network token broker 14 may provide the cryptographic signing by a decision making technique. Referring now to FIG. 2, an example decision making technique, designated generally as 26, may be as follows:

a) receiving cryptographic signatures of the application information and the network traffic information to provide received cryptographic signature and network traffic information (process block 28);

b) identifying the application information authentication or host machine authentication of the received network traffic information and the received cryptographic signature to provide identified intercepted network information and cryptographic signature (process block 30);

c) computing a cryptographic signature of the identified traffic information including user authentication and user host OS configuration to provide computed cryptographic hash of the identified traffic information (process block 32);

d) comparing the computed network traffic information and the cryptographic signature against a whitelist and/or a blacklist database or comparing intercepted network information against whitelist or blacklist database to provide compared computed networked information and compared computed cryptographic signature (process block 34); and, e) digitally signing the network traffic information only if the compared computed network information and compared computed cryptographic signature are contained in the whitelist, and not contained in the blacklist (process block 36).

Figure 3:
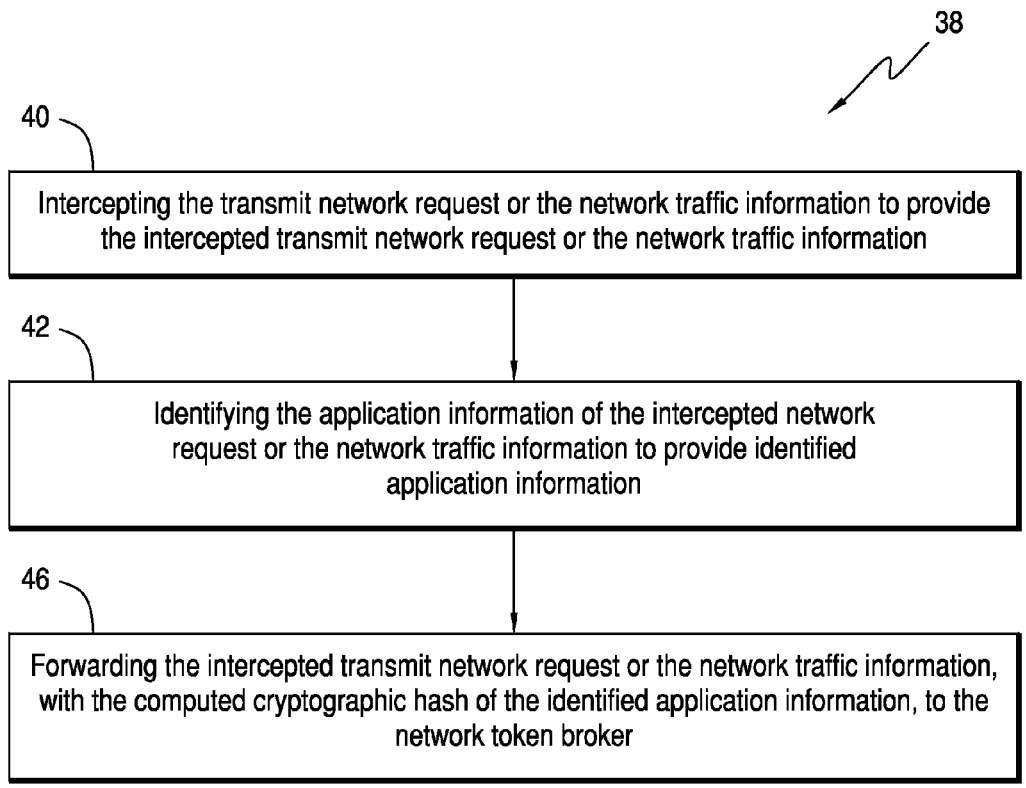
FIG. 3 is a flow chart showing an example of the monitoring technique used by the guard system.

Referring now to FIG. 3, the network client agent 12 may provide monitoring of the network traffic information by the following process, designated generally as 38:

a) intercepting the transmit network request or the network traffic information to provide the intercepted transmit network request or the network traffic information (process block 40);

b) identifying the application information of the intercepted network request or the network traffic information to provide identified application information (process block 42);

c) forwarding the intercepted transmit network request or the network traffic information, with the computed cryptographic hash of the identified application information, to the network token broker (process block 46).

In general terms, the guard system 16 of the present invention operates by the following process:

The guard system 16 of the present invention is designed to properly cooperate with the type of network client agent used. For example, if individual network packets are signed, by i) applying internet protocol (IP) encapsulation by adding a cryptographic hash field to the intercepted network traffic information or, ii) by applying an IPv4 header option field or IPv6 header chain field to the intercepted network traffic information, then the guard system 16 may provide inspection of the network traffic information by the process of:

a) receiving the cryptographically signed network traffic information from either the network client agent 12 or the network token broker 14;

b) testing the validity of the cryptographic signature to provide validated cryptographic signature;

c) stripping the signature to restore the request to provide original state prior to interception by the network client agent, and d) forwarding the original intercepted network traffic information to a secure network destination only if the signature is valid.

If the network token broker 14 provides the cryptographic signing by signing individual network packets, by applying a transport layer wrapping protocol to the intercepted network traffic information then the guard system 16 may operate as follows:

a) receiving the cryptographically signed token within the application layer protocol;

b) testing the validity of the cryptographic signature to provide validated cryptographic signature;

c) stripping the token to restore the application layer request to provide the original state prior to interception by the network client agent, and d) forwarding the original intercepted network traffic information to a secure network destination only if the signature is valid.

Figure 4:
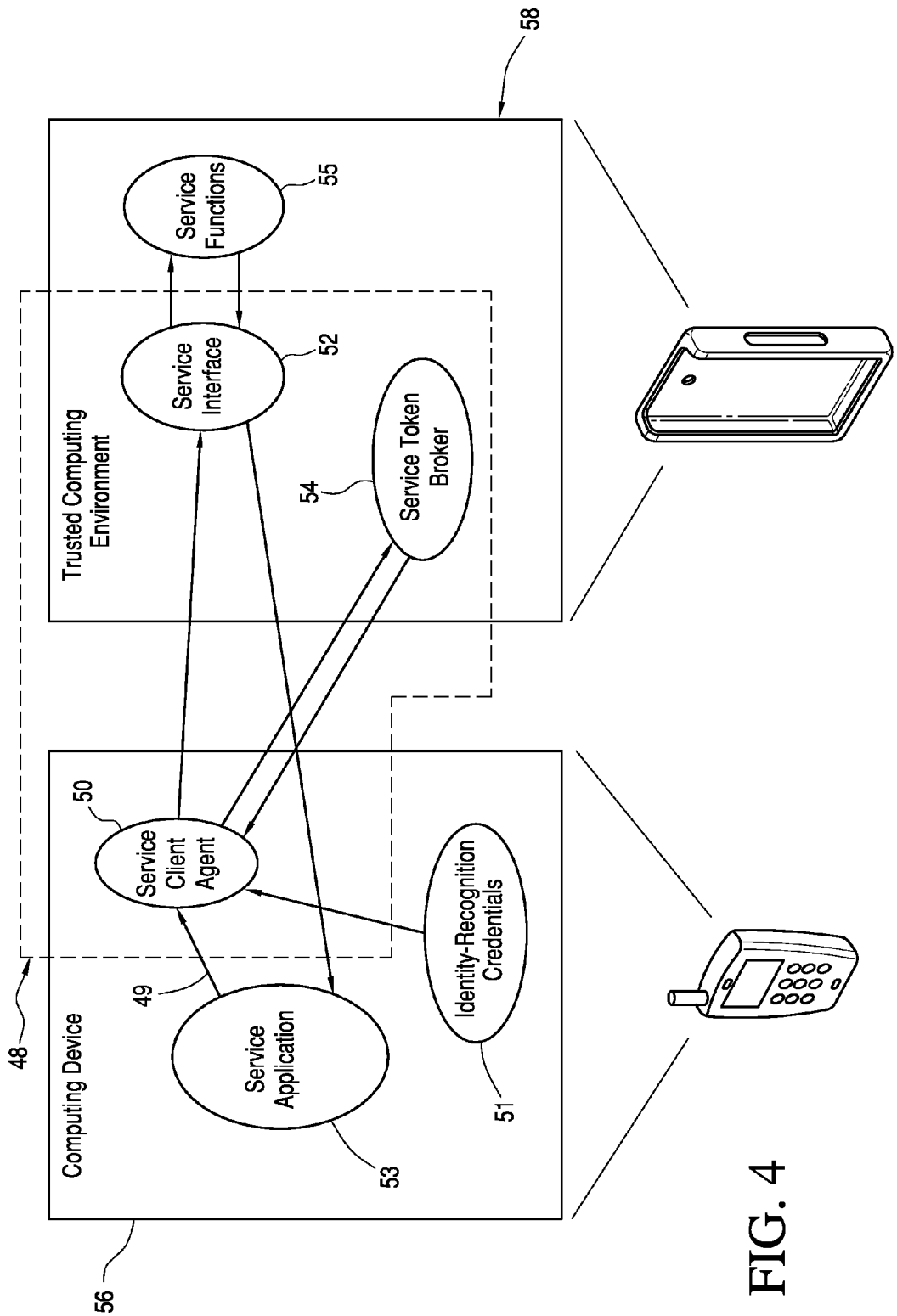
FIG. 4 is a schematic illustration of a second embodiment of the present invention embodied as a system for authenticating a request from an untrusted computing device to access an interface for service functions in a trusted computing environment.

Referring now to FIG. 4, a second embodiment of the present invention is illustrated generally as 48. In this embodiment the invention is embodied as a system for authenticating a request 49 from an untrusted computing device 56 to access a service interface 52 for service functions 55 in a trusted computing environment 58. The system 48 includes a service client agent 50; a service token broker 54; and, a service interface 52. The service client agent 50 is operably connected to the untrusted computing device 56 and is configured to present identity-recognition credentials 51 with service requests 49 from service applications 53 to access the service interface 52 to service functions 55 in the trusted computing environment 58. A trusted computing environment is characterized by an assumption of integrity of computing functions, software and information based on prior analysis and development pedigree. An untrusted computing environment is characterized by assumption that computing functions and software are potentially compromised or erroneous and information is potentially incorrect or falsified. The service token broker 54 is contained in the trusted computing environment 58. It is operably connected to the service client agent 50 and contains a database of identity-recognition credentials.

The service token broker 54 is configured to cooperate with the service client agent 50 for i) verifying whether the service requests should have access to the trusted computing environment 58, and ii) cryptographically signing the service requests with a service authorization token, to authorize access for the services or functions. The identity-recognition credentials 51 include at a minimum unique hardware identifiers but may also include software identifiers and hashes, user identification credentials, etc. The trusted computing environment 58 may be embodied as a communications sleeve as described with reference to the first embodiment discussed above.

The service interface 52 is operably connected to the untrusted computing device 56 and the service client agent 50. The service interface 52 is configured to inspect the service requests 49 from the service application 53 and reject any service requests 49 not signed with the service authorization token.

As discussed above with respect to the first embodiment, the computing device 56 may be, for example, a type of smart cell phone, laptop computer, computer pad, etc. The service client agent 50 may be a software component generally running on the computing device 56 or alternately may be a firmware function implemented in computing device 56 hardware. The service token broker 54 and the service interface 52 may be embodied within a communication sleeve constructed to attach to the computing device 56. The communication sleeve may include, for example, any number of casings for example protective enclosures, charging or docking cradles, surplus batteries, antenna extenders, mounting brackets or peripheral components for protecting and holding the computing device 56 or extending its functionality. The service token broker 54 can be implemented as a software component running on the communication sleeve 20 or as a firmware component in communication sleeve 20 hardware. The service interface 52 can be implemented as a high-assurance network guard system providing strict isolation between the secure network 8 and the computing device 56. Or, the service interface 52 can be implemented as a software component providing functionality similar to a commercially available firewall proxy system, a standalone software component running on a computer server, or a standalone specialized computer system. The service client agent 50 may be incorporated into the computing device 56 or may be embodied as a specialized item of computer hardware. Thus, the phrase that the service client agent 50 is "operably connected" to the computing device 56 is deemed to be broadly construed to encompass both potential scenarios.

The service token broker 54 may provide the cryptographic signing by signing individual network packets. This may be provided by, for example, applying internet protocol (IP) encapsulation by adding a cryptographic hash field to the intercepted network traffic information. Alternatively, it may be accomplished by applying an Internet Protocol header field such as an IPv4 header option field or IPv6 header chain field to the intercepted network traffic information. Or, such a signing may be accomplished by applying a transport layer wrapping protocol to the intercepted network traffic information.

The service token broker 54 may provide the cryptographic signing by adding a token. This may be by adding a tag-value pair to an application layer protocol.

Alternatively, the service token broker 54 may provide the cryptographic signing by a decision making technique. An example decision making technique may be as follows:

a) receiving the identity-recognition credentials 51 and service request information 49 from the service requests to provide the received identity-recognition credentials 51, and the service request information 49;

b) identifying the identity-recognition credentials 51 and the received service request information 49 to provide identified service request information and identified identity-recognition credentials;

c) computing a cryptographic signature of the identified service request information including the identified identity-recognition credentials to provide a computed cryptographic hash of the identified service request information;

d) comparing the computed service request information and the computed cryptographic signature against a whitelist and/or a blacklist database or comparing the service request information against a whitelist or blacklist database to provide compared computed service request information and compared computed cryptographic signature; and, e) digitally signing the service request information only if the compared computed service request information and compared computed cryptographic signature are contained in the whitelist, and not contained in the blacklist.

In general terms, the service interface 52 of the present invention operates by the following process:

The service interface 52 of the present invention is designed to properly cooperate with the type of service client agent used. For example, if individual network packets are signed, by i) applying internet protocol (IP) encapsulation by adding a cryptographic hash field to the intercepted network traffic information or, ii) by applying an IPv4 header option field or IPv6 header chain field to the intercepted network traffic information, then the service interface 52 may provide inspection of the network traffic information by the process of:

a) receiving the cryptographically signed service request information;

b) testing the validity of the cryptographic signature to provide validated cryptographic signature; and, c) fulfilling the original service request only if the signature is valid.

Other embodiments and configurations may be devised without departing from the spirit of the invention and the scope of the appended claims.

The invention claimed is:

1. A system for preventing a computing device from obtaining unauthorized access to a secure network, comprising:

a) a network client agent operably connected to a computing device configured to intercept network traffic information from applications running on said computing device and transmit a network request comprising application information and said network traffic information;

b) a network token broker operably connected to said network client agent and containing a database of application information, said network token broker configured to receive said network request and cooperate with said network client agent for i) verifying whether said network request should be granted access to said secure network, and ii) generating a network authorization token by cryptographically signing the intercepted network traffic information to provide a cryptographic signature, to authorize network access for said intercepted network traffic information, wherein said network authorization token is returned to said network client agent, said network client agent attaching the network authorization token to the network traffic information; and, c) a guard system operably connected to said computing device, configured to receive said network traffic information and the attached network authorization token, and to inspect said network traffic information from said network client agent on said computing device and reject any traffic information not signed with said network authorization token, wherein said guard system is configured to provide inspection of said network traffic information by the process of:

i) receiving said network request and said network authorization token;

ii) testing the validity of said network authorization token to provide a validated said network request;

iii) stripping said network authorization token to restore said network request to provide original state prior to interception by said network client agent, and iv) forwarding said intercepted network traffic information to a secure network destination only if said network authorization token is valid.

2. The system of claim 1, wherein said network token broker provides said cryptographic signature by signing individual network packets.

3. The system of claim 2, wherein said guard system provides inspection of said network traffic information by the process of:

a) receiving said cryptographically signed individual network packets;

b) testing the validity of said cryptographic signature to provide validated cryptographic signature;

c) stripping said signature to restore said signed individual network packets to provide original state prior to interception by said network client agent, and d) forwarding said original intercepted network traffic information to a secure network destination only if said signature is valid.

4. The system of claim 1, wherein said network token broker provides said cryptographic signature by signing individual network packets, by applying internet protocol (IP) encapsulation by adding a cryptographic hash field to said intercepted network traffic information.

5. The system of claim 4, wherein said guard system provides inspection of said network traffic information by the process of:

a) receiving said cryptographically signed individual network packets;

b) testing the validity of said cryptographic signature to provide validated cryptographic signature;

c) stripping said signature to restore said signed individual network packets to provide original state prior to interception by said network client agent, and d) forwarding said original intercepted network traffic information to a secure network destination only if said signature is valid.

6. The system of claim 1, wherein said network token broker provides said cryptographic signature by signing individual network packets, by applying an Internet Protocol header field to said intercepted network traffic information.

7. The system of claim 6, wherein said guard system provides inspection of said network traffic information by the process of:

a) receiving said cryptographically signed individual network packets;

b) testing the validity of said cryptographic signature to provide validated cryptographic signature;

c) stripping said signature to restore said signed individual network packets to provide original state prior to interception by said network client agent, and d) forwarding said original intercepted network traffic information to a secure network destination only if said signature is valid.

8. The system of claim 1, wherein said network token broker provides said cryptographic signature by signing individual network packets, by applying a transport layer wrapping protocol to said intercepted network traffic information.

9. The system of claim 8, wherein said guard system provides inspection of said network traffic information by the process of:
  a) receiving said cryptographically signed individual wrapped network packets;
  b) testing the validity of said cryptographic signature to provide validated cryptographic signature;
  c) stripping said signature and transport layer wrapper to restore said signed individual network packets to provide original state prior to interception by said network client agent, and
  d) forwarding said original intercepted network traffic information to a secure network destination only if said signature is valid.

10. The system of claim 1, wherein said network token broker provides said cryptographic signature by adding a token to a transport or session protocol.

11. The system of claim 10, wherein said guard system provides inspection of said network traffic information by the process of:
  a) receiving said cryptographically signed token and network traffic information;
  b) testing the validity of said cryptographic signature to provide validated cryptographic signature;
  c) stripping said token to restore network traffic information to provide original state prior to interception by said network client agent, and
  d) forwarding said original intercepted network traffic information to a secure network destination only if said signature is valid.

12. The system of claim 1, wherein said network token broker provides said cryptographic signature by adding a token, by adding a tag-value pair to an application layer protocol.

13. The system of claim 12, wherein said guard system provides inspection of said network traffic information by the process of:
  a) receiving said cryptographically signed token within said application layer protocol;
  b) testing validity of said cryptographic signature to provide validated cryptographic signature;
  c) stripping said token to restore said application layer request to provide original state prior to interception by said network client agent, and
  d) forwarding said original intercepted network traffic information to a secure network destination only if signature is valid.

14. The system of claim 1, wherein said network token broker provides said cryptographic signature by adding a token, by providing a tag-value pair matched to the application layer protocol via an out-of-band transport.

15. The system of claim 1, wherein said network token broker provides said cryptographic signature by a decision making technique.

16. The system of claim 1, wherein said network client agent provides monitoring of said network traffic information by the process of:
  a) intercepting said transmit network request or said network traffic information to provide said intercepted transmit network request or said network traffic information;
  b) identifying the application information of said intercepted network request or said network traffic information to provide identified said user computer and application information;
  c) forwarding said intercepted transmit network request or said network traffic information, with said computed cryptographic hash of said identified application information, to said network token broker.

17. The system of claim 1, wherein said network token broker and said guard system are embodied within a communication sleeve constructed to attach to said computing device.

18. A system for preventing a computing device from obtaining unauthorized access to a secure network, comprising:
  a) a network client agent operably connected to a computing device configured to intercept network traffic information from applications running on said computing device and transmit a network request comprising application information and said network traffic information;
  b) a network token broker operably connected to said network client agent and containing a database of application information, said network token broker configured to receive said network request and cooperate with said network client agent for i) verifying whether said network request should be granted access to said secure network, and ii) generating a network authorization token by cryptographically signing the intercepted network traffic information to provide a cryptographic signature, to authorize network access for said intercepted network traffic information, wherein said network authorization token is returned to said network client agent, said network client agent attaching the network authorization token to the network traffic information; and,
  c) a guard system operably connected to said computing device, configured to receive said network traffic information and the attached network authorization token, and to inspect said network traffic information from said network client agent on said computing device and reject any traffic information not signed with said network authorization token,
  wherein said network token broker provides said cryptographic signing by a decision making technique, by the process of:
    receiving cryptographic signatures of said application information and said network traffic information to provide received cryptographic signature and network traffic information;
    identifying the application information authentication of said received network traffic information and said received cryptographic signature to provide identified intercepted network information and cryptographic signature;
    computing a cryptographic signature of said identified traffic information including user authentication and user host OS configuration to provide computed cryptographic hash of said identified traffic information;
    comparing said computed network traffic information and said cryptographic signature against at least one of a whitelist and a blacklist database or comparing intercepted network information against whitelist or blacklist database to provide compared computed networked information and compared computed cryptographic signature; and, digitally signing the network traffic information only if said compared computed network information and compared computed cryptographic signature are contained in said whitelist, and not contained in said blacklist.

19. A method for preventing a computing device from obtaining unauthorized access to a secure network, comprising the steps of:
  a) intercepting network traffic information from applications running on a computing device utilizing a network client agent operably connected to said computing device and transmitting a network request comprising application information and said network traffic information;
  b) verifying whether said network request should be granted access to said secure network utilizing a network token broker operably connected to said network client agent containing a database of application information;
  c) cryptographically signing said intercepted network traffic information with a network authorization token, to authorize network access for said intercepted network traffic information wherein said cryptographically signing is provided by generating a network authorization token and wherein said network authorization token is returned to said network client agent, said network client agent attaching the network authorization token to the network traffic information; and,
  d) inspecting said network traffic information from said network client agent on said computing device and rejecting any traffic information not signed with said authorization server key utilizing a guard system operably connected to said computing device and said network client agent, wherein said guard system is configured to receive said network traffic information and the attached network authorization token, and wherein, wherein said guard system is configured to provide said inspecting of said network traffic information by the process of:
    i) receiving said network request and said network authorization token;
    ii) testing the validity of said network authorization token to provide a validated said network request;
    iii) stripping said network authorization token to restore said network request to provide original state prior to interception by said network client agent, and
    iv) forwarding said intercepted network traffic information to a secure network destination only if said network authorization token is valid.

20. A system for authenticating a request from an untrusted computing device to access an interface for service functions in a trusted computing environment, comprising:
  a) a service client agent operably connected to an untrusted computing device configured to present identity-recognition credentials with service requests from service applications to access an interface to service functions in a trusted computing environment;
  b) a service token broker contained in said trusted computing environment, operably connected to said service client agent and containing a database of identity-recognition credentials and unique hardware identifiers, said service token broker configured to receive said service requests and cooperate with said service client agent for
    i) verifying whether said service requests should have access to said trusted computing environment, and ii) generating a service authorization token by cryptographically signing the service requests to provide a cryptographic signature, to authorize access for said services or functions, wherein said network service token is returned to said service client agent, said service client agent attaching the service authorization token to the service requests; and,
  c) a service interface in a trusted computing environment operably connected to said service client agent, configured to receive said service requests and the attached service authorization token, and to inspect said service requests from said service client agent on said untrusted computing device and reject any said service requests not signed with said service authorization token, wherein said service interface is configured to provide inspection of said service requests by the process of:
    i) receiving said service requests and said service authorization token;
    ii) testing the validity of said service authorization token to provide a validated said service request;
    iii) stripping said service authorization token to restore said service request to provide original state prior to inspection by said service client agent, and
    iv) forwarding said inspected service request to a secure network destination only if said service authorization token is valid.

21. The system of claim 20, wherein said service token broker provides said cryptographic signing by adding a token to a transport or session protocol.

22. The system of claim 21, wherein said service interface provides inspection of said service request information by the process of:
  a) receiving said cryptographically signed service request information;
  b) testing the validity of said cryptographic signature to provide a validated cryptographic signature; and,
  c) fulfilling said original service request only if said signature is valid.

23. The system of claim 20, wherein said service token broker provides said cryptographic signing by adding a token, by adding a tag-value pair to an application layer protocol.

24. The system of claim 23, wherein said service interface provides inspection of said service request information by the process of:
  a) receiving said cryptographically signed service request information;
  b) testing the validity of said cryptographic signature to provide a validated cryptographic signature; and,
  c) fulfilling said original service request only if said signature is valid.

25. The system of claim 20, wherein said service token broker provides said cryptographic signing by adding a token, by providing a tag-value pair matched to the application layer protocol via an out-of-band transport.

26. The system of claim 25, wherein said service interface provides inspection of said service request information by the process of:
  a) receiving said cryptographically signed service request information;
  b) testing the validity of said cryptographic signature to provide a validated cryptographic signature; and,
  c) fulfilling said original service request only if said signature is valid.

27. The system of claim 20, wherein said service token broker provides said cryptographic signing by a decision making technique.

28. A system for preventing a computing device from obtaining unauthorized access to a secure network, comprising:
   a) a service client agent operably connected to an untrusted computing device configured to present identity-recognition credentials with service requests from service applications to access an interface to service functions in a trusted computing environment;
   b) a service token broker contained in said trusted computing environment, operably connected to said service client agent and containing a database of identity-recognition credentials and unique hardware identifiers, said service token broker configured to receive said service requests and cooperate with said service client agent for i) verifying whether said service requests should have access to said trusted computing environment, and ii) generating a service authorization token by cryptographically signing the service requests to provide a cryptographic signature, to authorize access for said services or functions, wherein said network service token is returned to said service client agent, said service client agent attaching the service authorization token to the service requests; and,
   c) a service interface in a trusted computing environment operably connected to said service client agent, configured to receive said service requests and the attached service authorization token, and to inspect said service requests from said network client agent on said untrusted computing device and reject any said service requests not signed with said service authorization token, wherein said service token broker provides said cryptographic signing by a decision making technique, by the process of:
   receiving said identity-recognition credentials, said service request information from said service requests to provide said received identity-recognition credentials, said unique hardware identifiers and said service request information;
   identifying said identity-recognition credentials and said received service request information to provide identified service request information and identified identity-recognition credentials;
   computing a cryptographic signature of said identified service request information including said identified identity-recognition credentials to provide a computed cryptographic hash of said identified service request information;
   comparing said computed service request information and said computed cryptographic signature against at least one of a whitelist and a blacklist database or comparing said service request information against a whitelist or blacklist database to provide compared computed service request information and compared computed cryptographic signature; and,
   digitally signing the service request information only if said compared computed service request information and compared computed cryptographic signature are contained in said whitelist, and not contained in said blacklist.

* * * * *